(12) United States Patent
Grayson et al.

(10) Patent No.: US 6,219,564 B1
(45) Date of Patent: Apr. 17, 2001

(54) TIME BASE ALIGNMENT FOR DIGITAL MOBILE PHONES

(75) Inventors: Mark Grayson, London; Mark James Walton, Berkshire, both of (GB)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/321,593

(22) Filed: May 28, 1999

(51) Int. Cl.[7] ................................ H04B 1/38; H04M 1/00
(52) U.S. Cl. .................... 455/574; 455/423; 455/502; 455/67.6; 455/503; 455/425; 370/311; 370/350; 375/355
(58) Field of Search ................................ 455/502, 503, 455/67.1, 67.6, 423, 425, 574; 370/350, 503, 516, 507; 375/354, 357, 356, 362, 371

(56) References Cited

U.S. PATENT DOCUMENTS

| 5,416,435 | * | 5/1995 | Jokinen et al. | 327/113 |
| 5,568,513 | * | 10/1996 | Croft et al. | 375/224 |
| 5,737,323 | * | 4/1998 | Lansdowne | 370/311 |

FOREIGN PATENT DOCUMENTS 0 586 256 A2  3/1994  (EP).
2 297 884  8/1998  (GB).

* cited by examiner

Primary Examiner—William G. Trost
Assistant Examiner—Marceau Milord
(74) Attorney, Agent, or Firm—Sughrue, Mion, Zinn, Macpeak & Seas, PLLC

(57) ABSTRACT

In a digital mobile telecommunications station having a high frequency timebase circuit which can by synchronized with a base station timebase, the high frequency timebase circuit is shut down for a predetermined period for power saving purposes. Following completion of the shut down period, the timebase circuit is re-synchronized. A first counter counts cycles of a relatively low frequency clock while a second counter counts cycles of a high frequency clock forming part of the timebase circuit. A first storage stores the count in the second counter at a first specified point in timebase cycle during shutdown while a second storage stores the count in the second counter at a second specified point in a timebase cycle following completion of the shut down. A timebase corrector corrects the timebase after such completion on the basis of the number of cycles of the low frequency clock which shut down persisted, the number stored in the first and second storages and data identifying the first and second points in the timebase cycles referred to.

6 Claims, 2 Drawing Sheets

TIME BASE ALIGNMENT FOR DIGITAL MOBILE PHONES

BACKGROUND OF THE INVENTION

This invention relates to digital mobile phone systems (e.g. GSM (global system for mobile communication) phones).

Digital mobile phone systems (e.g. GDM phones) rely for their operation on accurate matching of a local timebase within a mobile station with the timebase of a base station. During idle or standby operation, the mobile phone must receive pages periodically, together with decoding broadcast information concerning the network configuration. For power-saving between these periods of activity it is desirable to shut down as much of the mobile station circuitry as possible and, as timebse circuitry operates at a high frequency, for example 13 MHz in the GSM system, considerable power can be saved by shutting down the timebase circuitry "sleep" periods.

GB 2297884 A discloses a power saving arrangement in a mobile telephone which has a high frequency system clock and a processor arranged to process polling signals received while the telephone is in its standby condition. When polling signals are not being received, it is possible for the telephone to be placed in a sleep condition, by de-activating the system clock. Re-activation occurs in response to a calibrated number of clock cycles produced by a lower frequency sleep clock. Upon re-activation, system clock counters, specifying sub-frame periods and frame periods are re-loaded so that they may be re-activated at the required phase. The phase of these counters is compared with signals received from base stations and modifications are made to system counts as required. The extent to which modification are required is also used to re-calibrate the sleep clock.

EP 0586256 A2 discloses a time measurement system for measuring time accurately with an inaccurate clock. Two clock oscillators are compared and the momentary error of the slower clock oscillator is measured. When the error change rate of the slower clock oscillator is slow enough, the fast clock oscillator can be switched off for longer time interval. With the help of this apparatus and method of operation power can be saved in portable equipment which requires accurate time measurement.

However, re-synchronizing the mobile station timebase with the base station timebase on re-awakening (e.g. for paging reception) needs to be accomplished quickly and it is therefore highly desirable to reconstruct the mobile station timebase in synchronizm with its operation before shutdown without reference to the base station signals, or utilizing the base station signals to reconstruct the time base takes time and uses considerable power.

SUMMARY OF THE INVENTION

It is therefore an object of the present invention to provide a digital mobile telecommunication station in which there is provision for timebase reconstruction after a power-saving shut down.

Other objects of this invention will become clear as the description proceeds.

In accordance with the invention, there is provided a digital mobile telecommunication station having a high frequency timebase circuit which can be synchronized with a base station timebase, means for shutting down said high frequency timebase circuit for a predetermined period for power saving purposes, and means for re-synchronizing the timebase circuit following completion of the shut down period. The re-synchronizing means includes a relatively low frequency clock, a first counter for counting cycles of the low frequency clock, second counter means for counting cycles of a high frequency clock forming part of the timebase circuit, first storage means for storing the count in the second counter means at a first specified point in a timebase cycle during shutdown, second storage means for storing the count in the second counter means at a second specified point in a timebase cycle following completion of the shut down, and means for correcting the timebase after such completion on the basis of the number of cycles of the low frequency clock for which shut down persisted, the numbers stored in the first and second storage means and data identifying the first and second points in the timebase cycles referred to.

DESCRIPTION OF THE PREFERRED EMBODIMENTS

Figure 1:
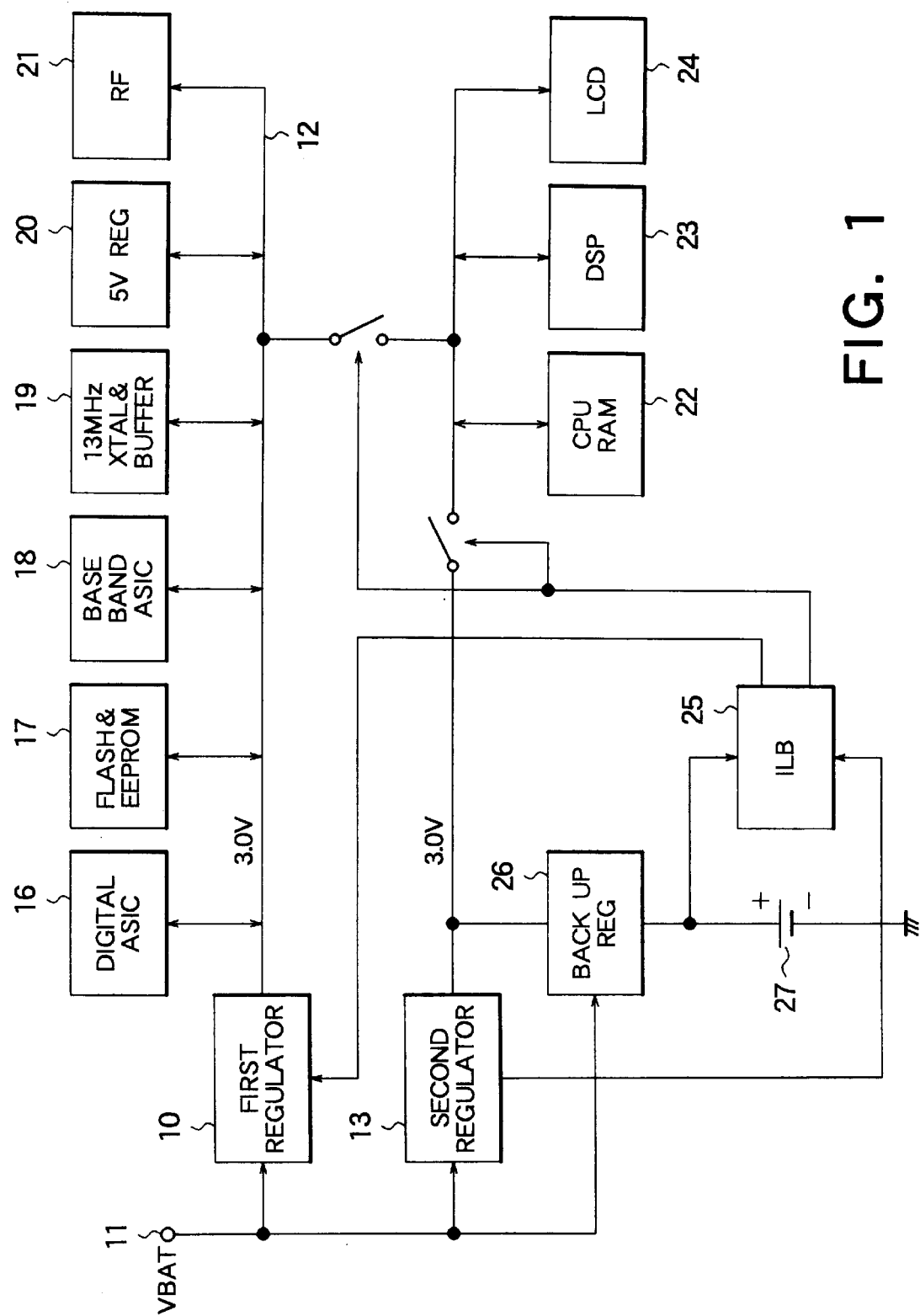
FIG. 1 is a block diagram showing the power supply arrangements of one embodiment of a mobile telecommunication station in accordance with the present invention.

As shown in FIG. 1, the mobile phone apparatus includes a main switch-mode power supply regulator 10 which controls the supply of power from a main battery 11 to a main 3.0V supply bus 12. There is also a lower power linear power supply regulator 13 which is used to supply power to some of the components of the mobile station during power-saving operation.

Power for all the power consuming circuits of the mobile station is provided in normal operation by the main regulator 10. These circuits includes an ASIC (application specific integrated circuit) 16 (including a CPU (central processing unit)), flash and EEPROM memory 17, and a Base Band ASIC 18 (chip size package) unit which provides many of the functions of the mobile station such as Tx modulation, DAC (digital to analogue converter) services, Rx filtering, DC calibration, ADC (analogue to digital converter) services, audio processing and Time base counters. The Base Band ASIC 18 is connected to the audio circuit (not shown) of the phone. A 13 MHz crystal oscillator and buffer circuit 19 which provides a high frequency clock for the system, a 5V regulator 20 (for the SIM (subscriber identity module) and audio circuits), and the RF circuits 21 of the phone apparatus are also supplied directly by the bus 12. Power for the CPU RAM (random access memory) unit 22, for the DSP (digital signal processor) unit 23 (which provides algorithm implementation, speech encoding and decoding and other services), and for an LCD (liquid crystal display) display 24 is also normally supplied from the bus 12, but from the low power second regulator 13 during power-saving operation.

Connection of the RAM 22, the DSP 23 and the LCD 24 to the two power supply regulators is controlled by two switch devices under the control of an isolated logic block (ILB) 25 which is continuously powered by a back-up regulator and/or a back-up battery 27. The ILB is, in fact, a part of the ASIC, but is electrically isolated from the remainder of the ASIC. The ILB also controls operation of the first regulator 10 and can turn it off and on as required.

Figure 2:
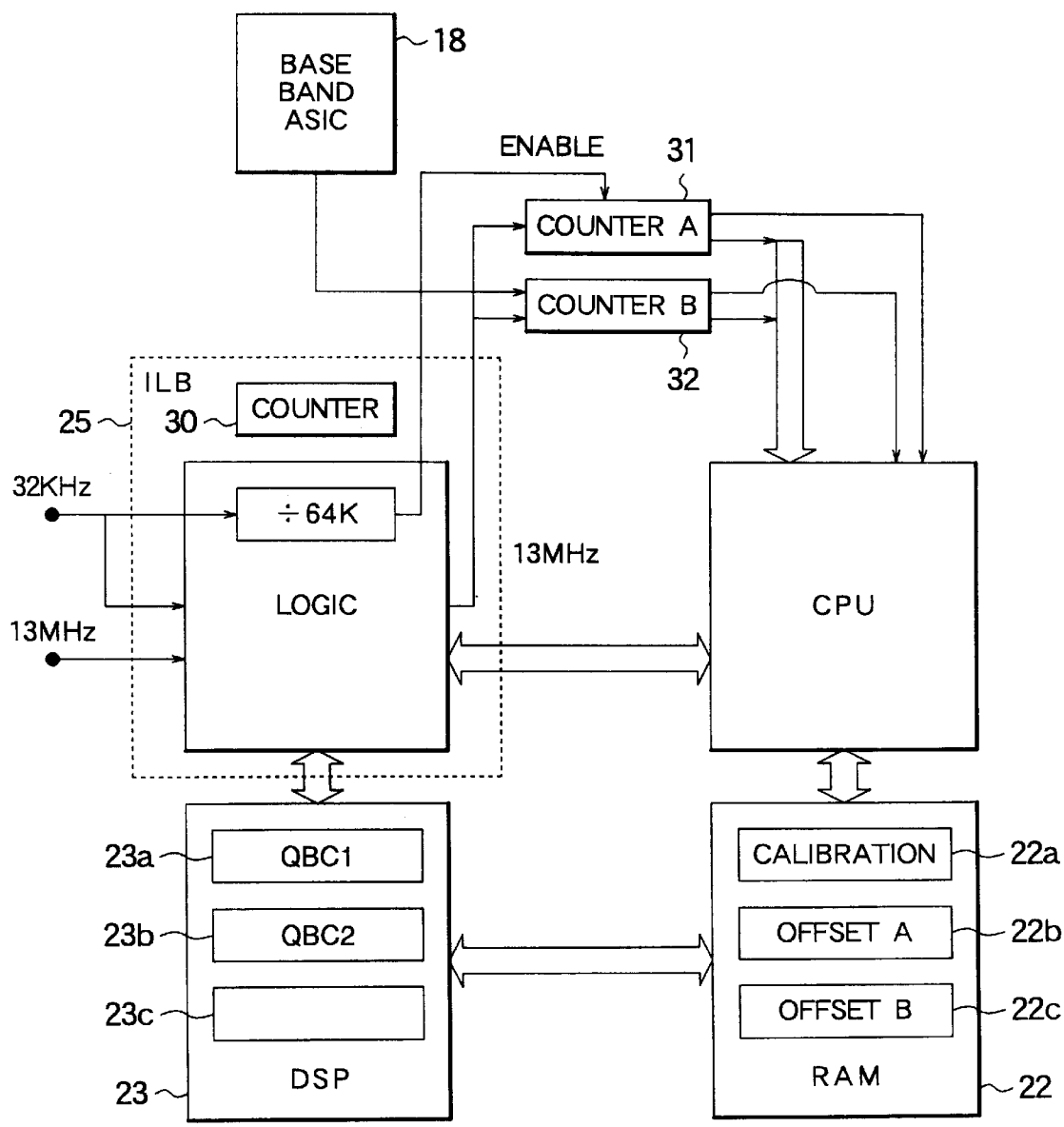
FIG. 2 is a block diagram of the timebase resynchronization means included in the mobile station.

In addition of the 13 MHz clock oscillator which is used for synchronizing operation of the mobile station with the signals transmitted from a base station, there is also a 32 KHz oscillator which is used for the timing of the "sleep" periods, while the main 13 MHz clock oscillator is powered down. As shown in FIG. 2, the ILB 25 includes a first counter 30 for counting pulses from the 32 KHz sleep clock. To allow for drift in the frequency of the 32 KHz clock period re-calibration thereof is needed.

The calibration operation involves the use of a calibration counter 31 which is controlled by a ÷64 K block in the ILB to count 13 MHz clocks for a period of 2 seconds determined in accordance with the 32 KHz clock. Under the control of the ILB, the count of the counter 31 at the end of the 2 second calibration period is transferred by the CPU to a specific RAM storage location 22a. The counter 31 is expected at the end of each calibration count to contain a count of exactly 26M, and any offset from this is taken as indicating an error in the frequency of the 32 KHz clock. The count in counter 31 at the end of each two second calibration period is compared with that stored in the last calibration period. If the difference exceeds a predetermined threshold a flag is set by the CPU to indicate that the 32 KHz clock is still not settled and inhibit power saving sleep operation. This ensures that drift of the 32 KHz clock frequency following power-up or the making or receiving of a call does not prevent time base reconstruction.

As shown in FIG. 2 the ASIC also contains a second counter means comprising a counter 32, which is used to count 13 MHz clocks under the control of the ILB during the operations required to commence sleep mode and at the end of the sleep mode at specific quarter (or eighth) bit numbers in the Time base created from the 13 MHz clock. The offset counts from the counter 32 are stored in two specific RAM location 22b and 22c as will be described hereinafter.

In operation, when the CPU has determined that a sleep period is possible, the CPU first issues a command to the DSP that the sleep period is to be commenced and then awaits a handshake confirmation from the DSP to confirm that sleep mode has been commenced. At this stage, the CPU provides the ILB with data specifying the duration of the required wait between turning on the 13 MHz clock at re-awakening and restarting of the CPU, data specifying the duration of the required wait between restarting of the CPU and the sending of a CPU interrupt, and data specifying the required wait between the sending of the interrupt and the recapture of the Time base. The CPU supplies to the ILB a digital signal representing the required wait during of the sleep period measured in cycles of the 32 KHz clock. The ILB sends a vectored interrupt to the DSP on the next rising edge of the 32 KHz clock. Simultaneously, the rising edge of the 32 KHZ clock causes the starting of the counters 30 and 32, which count 32 KHz and 13 MHz clocks respectively.

On receipt of the vectored interrupt from the ILB, the DSP issues a command to the Base Band ASIC to assert a Control line at QBC+2 and an interrupt to the DSP at QBC+3. The DSP stores the QBC value which will trigger Control in its own RAM location 23a. Following reception of the Base Band ASIC interrupt, the DSP enters clock stopped mode. Assertion of the Control line by the Base Band ASIC stops the counter 32 and causes the CPU to read the value stored in counter 32 and write it to the RAM location 22b. The CPU then instructs the ILB to enter sleep mode, and itself enters HALT mode. The ILB first removes power from the 13 MHz buffer and then turns off the switch-mode power supply, leaving the RAM 22, the DSP 23 and the LCD 24 powered by the linear power supply regulator 13 only.

Wake-up from sleep mode commences either at the expiry of the predetermined number of 32 KHz cycles or on detection of an asynchronous event such as the pressing of a key on the mobile station keypad. In either event the actual wake-up sequences commences at a rising edge of the 32 KHz clock, the next following an asynchronous event if this is what has triggered wake-up. At this time, the ILB switches on the switch-mode power supply regulator and, after a predetermined interval, enables the 13 MHz buffer. After a further predetermined period the ILB release the CPU reset and after yet a further interval it interrupts the CPU. The CPU then triggers waking up of the DSP and instructs the DSP to reconstruct the Time base. At the expiry of a timer the IBL interrupts the DSP. The rising edge of the 32 KHz clock which initiated the above-described actions also causes the IBL to reset and enable the 13 MHz counter 32 and stops the 32 KHz counter 30. The interrupt to the DSP triggers the loading in the Base Band ASIC of an event QBC+2 to output a Control line. The assertion of the Control line stops the counter 32 and causes the CPU to read the sleep time in 32 KHz cycles from the IBL and to read the 13 MHz counter offset from power on into the RAM location 22c, and the DSP saves the QBC+2 value into its own RAM location 23b.

The CPU now passes to the DSP, the total sleep time in 32 KHz cycles, the two offset counts from the RAM location 22b and 22c and the calibration count stored in the RAM location 22a. The DSP now uses these values to perform all the necessary operations to reconstruct the Time base in synchronizm with the base station timebase. The DSP calculations involve:

(i) determining the difference (δ) between the two offset count values from RAM locations 22b and 22c (divided by 12 to convert to QBM values), (ii) adding this difference δ to the sleep duration calculated in QBM values, (iii) adjusting the QBM value just calculated to allow for the current calibration of the 32 KHz clock, by multiplying it by a value derived by dividing the value from RAM location 22a by the product of the frequency ($13 \times 10^6$) and the calibration period duration (2 in the present duration), (iv) calculating an offset QBM value in accordance with a value stored in the DSP representing the ratio of the stored off air time base frequency to the on board 13 MHz frequency, and (v) adding this offset QBM value to the QBM value stored at RAM location 23a.

While this invention has thus far been described in conjunction with preferred embodiments thereof, it will now be readily possible for those skilled in the art to put this invention into various other manners.

What is claimed is:

1. A digital mobile telecommunications station having a high frequency timebase circuit for generating a mobile telecommunications station timebase which is synchronized with a base station timebase, said digital mobile telecommunication station comprising:

shutting-down means for shutting down said high frequency timebase circuit for a predetermined shutdown period for power saving purposes; and re-synchronizing means for re-synchronizing the mobile telecommunications station timebase following completion of the shutdown period, said re-synchronizing means comprising:

a low frequency clock;

a first counter for counting a number of cycles of said low frequency clock;

a second counter for counting a number of cycles of a high frequency clock of the timebase circuit;

first storage means for storing a first count corresponding to the number of cycles of said high frequency clock counted by said second counter at a first specified point in a timebase cycle during operations required to commence the shutdown period;

second storage means for storing a second count corresponding to the number of cycles of said high frequency clock counted by said second counter at a second specified point in a timebase cycle following completion of the shutdown period; and timebase correction means for correcting the mobile telecommunications station timebase after completion of the shutdown period on the basis of the number of cycles of the low frequency clock during the shutdown period, the first and second counts stored in said first and second storage means and data identifying said first and second points in the timebase cycles.

2. A digital mobile telecommunication station as claimed in claim 1, further comprising calibration means for periodic calibration of said low frequency clock against said high frequency clock, said timebase correction means correcting the mobile telecommunications station timebase in accordance with the period calibration.

3. A digital mobile telecommunication station as claimed in claim 2, wherein said calibration means comprises a third counter for counting the number of cycles of said high frequency clock for a time period determined by said low frequency clock and third storage means for storing a third count corresponding to the number of pulses counted by said third counter, said timebase correction means correcting the mobile telecommunications station timebase in accordance with the third count stored in the third storage means.

4. A digital mobile telecommunication station as claimed in claim 1, wherein said first and second points in the timebase cycles are fourth or eighth bit numbers in the timebase cycles.

5. A digital mobile telecommunication station as claimed in claim 4, further comprising calibration means for periodic calibration of said low frequency clock against said high frequency clock, said timebase correction means correcting the mobile telecommunications station timebase in accordance with the period calibration.

6. A digital mobile telecommunication station as claimed in claim 5, wherein said calibration means comprises a third counter for counting the number of cycles of said high frequency clock for a time period determined by said low frequency clock and third storage means for storing a third count corresponding to the number of pulses counted by said third counter, said timebase correction means correcting the mobile telecommunications station timebase in accordance with the third count stored in the third storage means.

* * * * *